April 5, 1932.  A. A. GORDON  1,852,077
COLOR SLIDE CONTROL FOR MULTICOLOR MAGAZINES
Filed Aug. 7, 1930  2 Sheets-Sheet 1
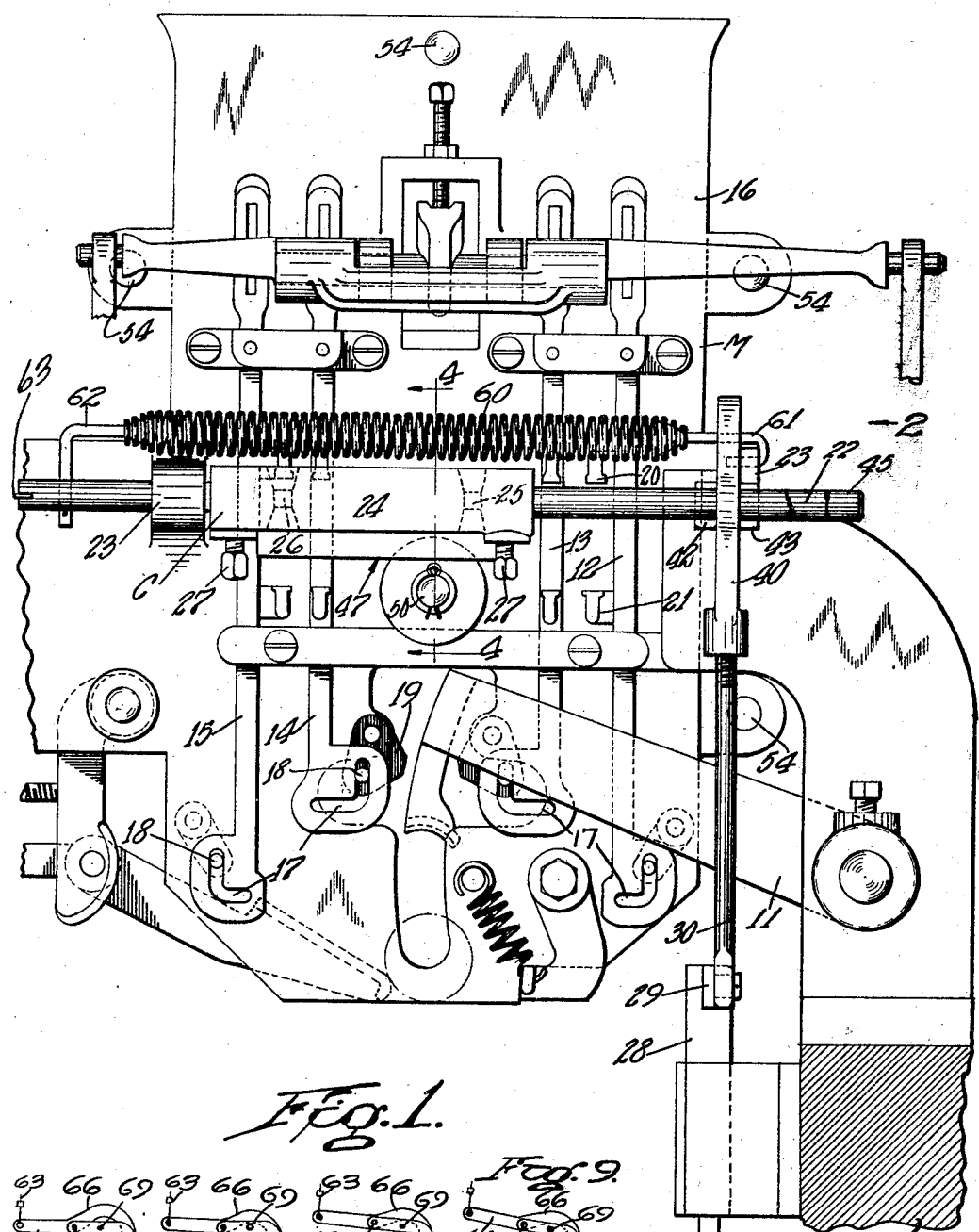
Fig. 1.
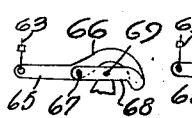
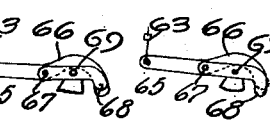
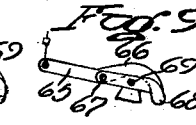
Fig. 6. Fig. 7. Fig. 8.
INVENTOR
ALBERT A. GORDON
ATTORNEYS April 5, 1932.  A. A. GORDON  1,852,077
COLOR SLIDE CONTROL FOR MULTICOLOR MAGAZINES
Filed Aug. 7, 1930  2 Sheets-Sheet 2
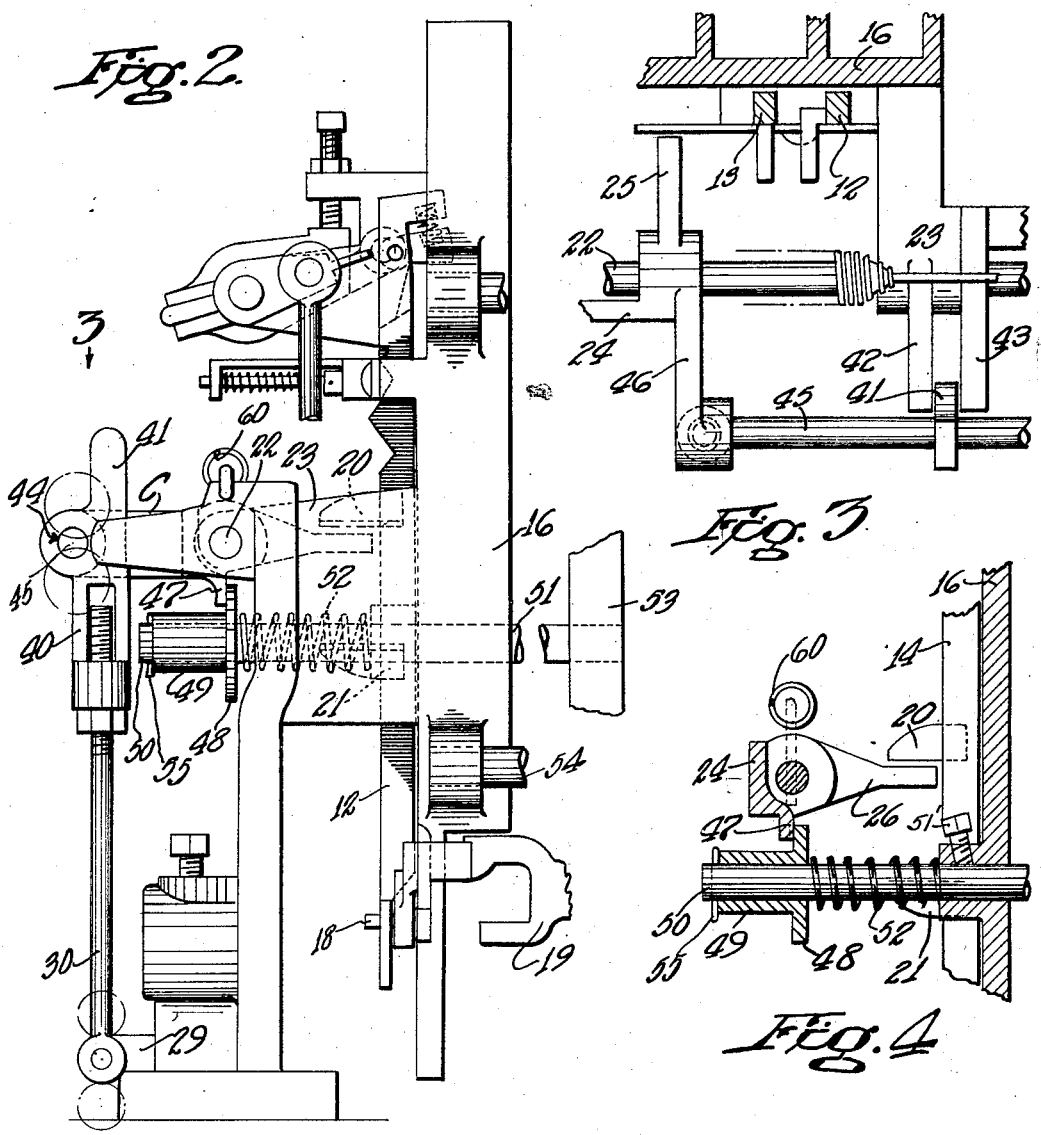
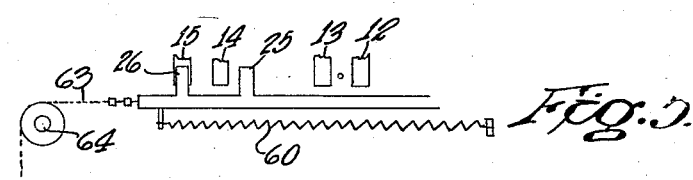
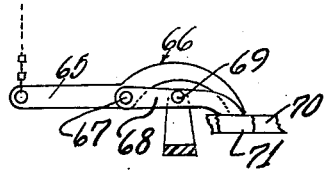

Patented Apr. 5, 1932

1,852,077

UNITED STATES PATENT OFFICE

ALBERT A. GORDON, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

COLOR SLIDE CONTROL FOR MULTICOLOR MAGAZINES

Application filed August 7, 1930. Serial No. 473,619.

This application is a continuation in part of my copending application Ser. No. 283,975 and relates to the color slide control for multicolor weft replenishing looms.

As ordinarily constructed magazines for fancy looms include two or more upright controllers or slides which cooperate with cradles supporting stacks of bobbins. A color slide is given longitudinal movements so that it may cooperate with the upright slide corresponding to the active shuttle at the time indication of weft exhaustion is given. The color slide also has angular movements in opposite directions so as to raise and depress the controllers.

Heretofore the longitudinal movements have been effected through a lever which could be adjusted as to the amount of its movement so as to alter the force derived from some part moving in time with the boxes to permit proper co-action between the color slide and the vertical slide. It is an important object of my present invention to eliminate the lever and attach the color slide directly by a flexible connection to a mechanism moving in timed relation with the boxes and to construct the mechanism so that its movements are equal to the movements of the color slide.

It is a further object of the invention to simplify the device which yieldingly holds the color slide in such a position that its fingers may pass between the lugs on the vertical slides, said device preferably being mounted on one of the tie rods of the magazine which hold the inner and outer bobbin guiding plates in spaced relation.

It is still another object of the invention to provide an improved means for connecting a regularly moving actuator which operates in a fixed plane to the color slide in any of the longitudinal positions which the latter may assume.

Another object is to arrange the spring which moves the color slide in one direction so as to maintain the latter normally in position to clear the controllers as the slide moves longitudinally.

With these and other objects in view which will appear as the description proceeds, my invention resides in the combination and arrangement of parts hereinafter described and set forth in the claims.

In the accompanying drawings, wherein a convenient embodiment of my invention is set forth, Fig. 1 is a side elevation of a four-color magazine made according to my present invention and viewed from the interior of the loom, Fig. 2 is a front elevation taken in the direction of arrow 2, Fig. 1, Fig. 3 is a top plan view taken in the direction of arrow 3, Fig. 2, Fig. 4 is a detailed vertical section on line 4—4 of Fig. 1, Fig. 5 is a diagrammatic view showing the connection between the pattern or box motion operated mechanism and the color slide, and Figs. 6, 7, 8 and 9 are detailed diagrammatic views showing the mechanism of Fig. 5 in different positions.

Referring to Figs. 1 and 2, I have shown a loom frame 10 on which is mounted the magazine M provided with a pivoted transferrer lever 11. A series of upright sliding controllers 12, 13, 14 and 15, respectively, are mounted on the inside magazine plate 16 which is arranged to guide the butts of the bobbins. The lower end of each slide is provided with a cam slot 17 to cooperate with the pin 18 of a cradle 19. The cradles support stacks of bobbins and are normally empty.

Each controller is provided with upper and lower lugs 20 and 21, respectively, spaced apart as suggested in Figs. 1 and 2. A color slide designated generally at C comprises a rod 22 slidable in bearings 23 preferably cast integral with the plate 16. Secured to the rod is a casting 24 having spaced fingers 25 and 26 located respectively to the front and rear of the center of the casting. These fingers move horizontally between the lugs 20 and 21 and are adapted to be swung upwardly to engage the upper lugs when indication of weft exhaustion is given by the active shuttle, and to move downwardly to engage the lower lug 21 of a raised vertical slide on the pick prior to the return to the magazine side of the loom of the exhausted shuttle.

Set screws 27 determine the angular position of the casting 24 with respect to the rod 22.

A vertically reciprocating block 28 is actuated by means of a cam not shown herein but well understood and has pivoted thereto an actuator lever 29 the left hand end of which, or that part near the center of the loom as shown in Fig. 2, is connected to an upwardly extending rod 30. When a shuttle is under the magazine the block 28 will move downwardly, and if sufficient weft is present the rod 30 will remain in the full line position shown in Fig. 2, but if insufficient weft is present so that the feeler mechanism not shown operates the rod will then move downwardly. The block is given an upward movement to cause rod 30 to rise periodically on alternate beats of the loom when the shuttle is on the opposite side of the lay from the magazine.

The matter thus far described is substantially the same as that shown in patent to Ryon No. 1,030,748 and forms no part of my present invention. The mechanism for co-operating with the upper ends of the vertical controllers forms no part of this invention and may be substantially the same as shown in co-pending application Ser. No. 385,596.

The present invention relates to means for giving the color slide C its longitudinal and also angular movements. The previously described rod 30 has at the upper end thereof a rod head 40 adjustable vertically thereon and having upwardly extending therefrom a flat finger 41 which extends between two guide arms 42 and 43 projecting inwardly from the plate 16. The rod head is perforated as at 44 and has loose sliding connection with a guide rod 45 secured to an extension 46 from the casting 24. The guide rod 45 is of sufficient length to have operative engagement with the rod head for all longitudinal positions of the color slide. When the vertical rod 30 is given its upward movement on alternate and non-detecting beats of the loom the guide rod will be lifted to cause the fingers 25 and 26 to move downwardly, while on detecting beats of the loom when an indication of exhaustion is given the guide rod will be moved downwardly so as to elevate the fingers and cause lifting of the vertical slide corresponding to the active shuttle. The guide arms 42 and 43 permit a certain amount of lateral movement of the rod head but not enough to result in cramping of the rod 45 in its slide bearing 44.

In order to preserve the color slide in the normal position shown in full lines in Fig. 2 I cast on the part 24 a downwardly extending horizontal fin 47 which extends preferably for the greater part of the length of the casting 24 and transversely of the controllers and has engagement with the flange 48 formed integral with a sleeve 49 slidably mounted on an extension 50 of tie rod 51, said rod being held in any one of a plurality of longitudinal positions by set screw 51'. Surrounding said extension is a compression spring 52 lying between the flange 48 and the fixed part of the plate 16 through which the tie rod extends. As shown in Fig. 2 the tie rod extends from the inner plate 16 to the outer plate 53 which guides the tips of the bobbins. The plates are held in spaced relation by several other tie rods 54 shown in Fig. 1 and the tie rod 51 is similar to that ordinarily employed except that it is somewhat longer, and is centrally placed with respect to the vertical slides, thus permitting the flange 48 to have engagement with the fin 47 for all longitudinal positions of the color slide.

A stop pin 55 on the extension 50 limits movement to the left as viewed in Fig. 2 of the sleeve and flange under action of the compression spring. The latter is sufficiently strong to support the weight of the rod 30 and parts associated therewith and is compressed only by the positive movement of the lever 29 at the time a vertical slide is being raised. At those times when the vertical rod 30 normally moves upwardly the pin 55 will hold the flange 48 from following the fin 47, and said rod 30 will be free to move downwardly by the combined action of gravity and movement of the lever 29.

In order to effect longitudinal movement of the color slide to the right as viewed in Fig. 1 I provide a relatively long tension spring 60 the right hand end of which has a hook 61 to be engaged by the arm 43 and the left hand end of which carries a second hook 62 to have operative relation with the rod 22. The action of the spring tends to hold the color slide fingers horizontal, since the spring is shortest when the fingers are in that position. A chain or other flexible connection 63 extends to the left from the rod 22 as viewed in Fig. 1 and is trained around a sheave 64 so placed as to hold that part of the chain attached to the rod 22 substantially in line with the axis of the latter. The chain extends downwardly and around other guides not shown to the opposite side of the loom, where it is attached to arm 65 of a relatively long lever 66. The latter is pivoted preferably intermediate its ends as at 67 to a short lever 68 which in turn is pivoted as at 69 to a fixed fulcrum at a point intermediate its ends. The free ends of the long and short levers co-act with pattern control risers 70 and 71, respectively. The latter may be of any form, shown herein as parts of vibrator levers for a Knowles loom, but the relation between the long and the short levers and their risers may take different forms depending upon the type of loom to which they are applied and I do not wish to be limited to the particular form of mechanism for actuating the arm 65. It is sufficient for the present invention to state that the parts are so proportioned that the part of arm 65 which is attached to the flexible chain has movements which are substantially equal to the movements of the color slide, no intervening multiplying mechanism being necessary. It is found that there is but one point on arm 65 where the chain 63 may properly be attached so that it will be given equal displacements with the four different positions which the upright ends of the long and short levers may assume.

Figs. 6, 7, 8 and 9 illustrate diagrammatically the four positions which the arm 65 may assume when the free ends of both levers are up, when the long lever is down and the short is up, when the long lever is up and the short down, and when both levers are down, respectively.

An inspection of the diagrammatic showing in Fig. 5 will illustrate the manner in which the parts described co-act. When the color slide is in its extreme left position the finger 26 will co-act with the rear vertical slide 15 and the arm 65 will be down with spring 60 expanded to its maximum position, finger 25 being idle. When lever 65 moves upwardly to its next position finger 26 will move to the right to co-act with vertical slide 14, the finger 25 being still inoperative. In the third position of arm 65 spring 60 will move the color slide so that finger 26 will be out of register with any of the vertical slides and finger 25 will be in vertical alignment with the lug of slide 13, and when the arm 65 assumes its highest position finger 25 will register with the lugs of slide 12.

From the foregoing it will be seen that I have provided a simple means of positioning the color slide angularly by means of parts supported by an extended tie rod and also provide for moving the color slide angularly through a rod head or similar device which has engagement with a rod substantially parallel to the rod 22. It will also be seen that the spring 60 acts substantially along a line parallel to the axis of the rod 22 to oppose the action of arm 65 and hold the free ends of the short and long levers against the risers through a flexible connection which is attached directly to the color slide. The spring 60 is so placed as not to interfere with the action of fingers 25 and 26 and tends to hold the color slide in the position shown in Fig. 4, that is, intermediate its extreme angular positions.

Having thus described my invention it will be seen that changes and modifications may be made therein by those skilled in the art without departing from the spirit and scope of the invention and I do not wish to be limited to the details herein disclosed, but what I claim is:

1. In a multicolor weft replenishing loom operating with a plurality of shuttles, a plurality of spaced bobbin controlling vertical slides, a longitudinally and angularly movable member to cooperate with the vertical slides, an element movable to different positions depending upon which shuttle is active, flexible connections between the element and member effective to displace the latter longitudinally connected directly to the member, and resilient means operatively connected to the member and a part of the loom tending to move the member yieldingly in one direction, the movements of the member being proportional to the movements of the element to cause the member to register properly with the vertical slides.

2. In a multicolor weft replenishing loom operating with a plurality of shuttles, a plurality of spaced vertical slides, a longitudinally and angularly movable member to cooperate with the vertical slides, an element movable to different positions depending upon which shuttle is active, flexible connections interposed between the element and member, a guide for said connections, the latter extending from the member toward the guide in a direction substantially parallel to the longitudinal movement of the member, and resilient means acting on the member to move the same yieldingly in one direction, the movements of the member being proportional to the movements of the element to cause the member to register properly with the vertical slides.

3. In a weft replenishing loom operating with a plurality of shuttles any one of which may become active, a plurality of spaced reserve bobbin controllers each movable from normal to abnormal position and returnable to normal position, a color selector movable angularly to give the controllers movements to normal and abnormal positions, the selector being movable transversely of the controllers to register with but one controller at a time, an element movable to as many different positions as there are controllers and dependent for its position upon which shuttle is active, flexible connections between the element and selector and connected directly to the latter to give the selector displacements transverse of the controllers equal to the movements of the element, and resilient means operatively connected to the selector and a part of the loom tending to move the selector in a direction opposite to that in which the element moves it.

4. In a weft replenishing loom operating with a plurality of shuttles any one of which may become active, a plurality of spaced reserve bobbin controllers each movable from normal to abnormal position and returnable to normal position, a color selector movable angularly to give the controllers movements to normal and abnormal positions, an element being movable transversely of the controllers and dependent for its position upon which shuttle is active, flexible connections between the element and selector, a guide for said connections, the latter extending from the selectors toward the guide in a direction substantially parallel to the movement of the selector, and resilient means tending to move the selector in a direction to keep the connections taut, the movements of the selector being equal to the movements of the element to cause the selector to register with the controllers.

5. In a multi-shuttle weft replenishing loom, a plurality of spaced reserve bobbin controllers each movable vertically to effect release of a reserve bobbin corresponding to a depleted active shuttle, a color selector movable vertically to effect movement of the controllers and movable transversely of the controllers to register with but one controller at a time, an element movable to as many different positions as there are controllers and coordinated with the active shuttle, flexible connections operatively connecting the selector and element, the element having movements equal to the movements of the selector to cause the latter to register with the controllers.

6. In a weft replenishing loom having a plurality of shuttles any one of which may become active and having a group of reserve bobbins for each shuttle, a plurality of controllers, one for each group of bobbins movable to release a bobbin corresponding to a depleted active shuttle, a selector having movements in the direction in which the controllers move to actuate the latter and having a movement transverse of the controllers to register with but one controller at a time, the selector assuming any one of several positions spaced apart by given distances, an element coordinated with the shuttles and moving to different positions depending upon which shuttle is active, the positions the element assumes being spaced apart by said given distances, connections between the selector and element whereby the latter moves the selector, and resilient means to move the selector in a direction opposite to that in which it is moved by the element.

7. In a weft replenishing loom having a plurality of shuttles any one of which may become active and having a group of reserve bobbins for each shuttle, a plurality of controllers, one for each group of bobbins, movable to release a bobbin corresponding to a depleted active shuttle, a selector having movements in the direction in which the controllers move to actuate the latter and having a movement transverse of the controllers to register with but one controller at a time, a pressure surface on the selector extending parallel to the transverse movement of the selector, a fixed guide on the loom substantially perpendicular to the pressure surface, a yielding support slidable on the guide and engaging the surface, and yielding means operatively related to the support and effective to maintain the selector in position while the latter moves transversely of the controllers.

8. In a weft replenishing loom having a plurality of shuttles any one of which may become active and having a group of reserve bobbins for each shuttle, a plurality of controllers, one for each group of bobbins, movable to release a bobbin corresponding to a depleted active shuttle, a selector having movements in the direction in which the controllers move to actuate the latter and having a movement transverse of the controllers to register with but one controller at a time, a fin on the selector parallel to the transverse movement thereof, a tie rod forming part of the loom and extended toward the fin, a sleeve slidable on the rod and engaging the fin, resilient means on the rod to hold the sleeve against the fin when the selector moves transversely of the controllers, and a stop on the rod to limit movement of the sleeve.

9. In a weft replenishing loom having a plurality of shuttles any one of which may become active and having a group of reserve bobbins for each shuttle, a plurality of controllers, one for each group of bobbins, movable to release a bobbin corresponding to a depleted active shuttle, a selector having movements in the direction in which the controllers move to actuate the latter and having a movement transverse of the controllers to register with but one controller at a time, a pressure surface on the selector extending parallel to the transverse movement of the selector, a fixed guide on the loom substantially perpendicular to the pressure surface, a yielding support slidable on the guide and engaging the surface, and yielding means operatively related to the support and effective to maintain the selector in position while the latter moves transversely of the controllers, the guide lying centrally with respect to the horizontal disposition of the controllers.

10. In a weft replenishing mechanism, a plurality of vertically reciprocable bobbin controllers, a color slide movable transversely of the controllers to register with them one at a time and movable pivotally to effect reciprocation of the controllers, the color slide when in normal position being out of engagement with the controllers when moving transversely, and a resilient member operatively connected to the color slide and exerting a force in the direction of transverse movement of the controllers but spaced from the axis of the color slide, said resilient member tending to hold the color slide in normal position.

11. In a weft replenishing mechanism, a plurality of vertically reciprocable bobbin controllers, a color slide movable longitudinally in a direction transverse of the controllers, fingers on the color slide to move angularly with the latter about an axis and engage parts of the controllers to reciprocate said controllers, and a tension coil spring having its axis substantially parallel to but removed from the axis of the color slide and operatively connected to the latter to effect longitudinal movement thereof in one direction and also tending to hold said fingers out of engagement with the said parts of the controllers as the color slide moves longitudinally.

12. In a weft replenishing loom having vertically reciprocable bobbin controllers, a longitudinally and angularly movable color slide to reciprocate the controllers, a fin depending from the slide, a yielding stop to engage the fin and hold the slide out of engagement with the controllers when said slide moves longitudinally, a guide element on the slide extending parallel to the direction of longitudinal movement of the slide, and a vertically reciprocable member spaced from and out of engagement with the fin and having sliding engagement with the guide element to be operatively related thereto in all longitudinal positions of the color slide.

13. In a weft replenishing magazine having vertical reciprocable bobbin controllers, a longitudinally and angularly movable color slide normally spaced from but capable of reciprocating the controllers, yielding means to cooperate with the color slide to normally position the latter relatively to the bobbin controllers, and a normally fixed support for the means capable of assuming a plurality of positions relatively to the color slide to hold the means and slide in operative cooperation.

14. In a weft replenishing magazine for a loom, a plurality of vertical moving bobbin controllers, a longitudinally and angularly movable color slide capable of reciprocating the controllers, a rod supported by the magazine, yielding means on the rod to cooperate with the color slide to normally position the latter relatively to the bobbin controllers, said rod capable of assuming a plurality of fixed positions in a direction of its length whereby the means may be held operatively related to the color slide in any one of the positions which the rod might assume.

In testimony whereof I have hereunto affixed my signature.

ALBERT A. GORDON.